GERMANIUM CURRENT CONTROLLING DEVICES

Filed April 28, 1954

Inventors:
Winfield W. Tyler;
Roger Newman,
by Paul A. Frank
Their Attorney.

United States Patent Office 2,871,427

Patented Jan. 27, 1959

2,871,427

GERMANIUM CURRENT CONTROLLING DEVICES

Winfield W. Tyler and Roger Newman, Schenectady, N. Y., assignors to General Electric Company, a corporation of New York Application April 28, 1954, Serial No. 426,098

9 Claims. (Cl. 317—239)

This invention relates to germanium electric current controlling devices and more particularly to germanium devices sensitive to heat or light, as well as to asymmetrically conductive devices.

One object of the invention is to provide germanium devices having unusually pronounced thermoconductive properties, namely, having resistivities which change markedly with small changes in temperature. Another object of the invention is to provide extremely thermosensitive low temperature germanium circuit control devices.

Still another object of the invention is to provide germanium devices exhibiting unusually pronounced photoconductive properties and exhibiting a high degree of change in resistivity level for different intensities of impinging light.

An additional object of the invention is to provide very sensitive photoconductive germanium devices suitable for infrared detection at low temperatures.

A further object of the invention is to provide improved germanium asymmetrically conducting devices.

A still further object of the invention is to provide germanium asymmetrically conducting devices which may be used at high frequencies, particularly in applications where high current capacities are required at high frequencies.

In general, semiconductor current controlling devices in accord with the invention are provided in the form of germanium crystalline bodies impregnated with a trace of iron. The germanium body is preferably impregnated by addition of iron to a germanium melt from which an iron impregnated crystal is grown.

The novel features believed characteristic of the invention are set forth in the appended claims. The invention itself, however, together with further objects and advantages thereof may best be understood by reference to the following description taken in connection with the accompanying drawings in which:

Figure 1:
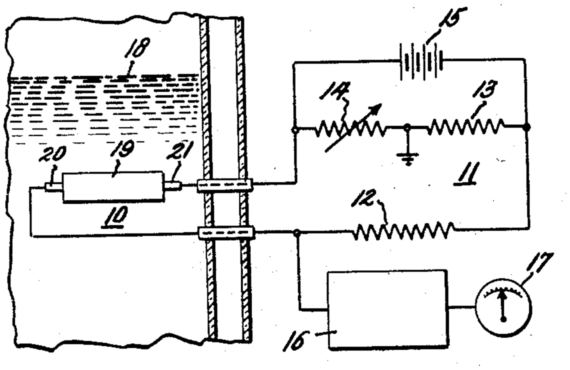
Fig. 1 illustrates a thermoconductive control device embodying the invention and an electric circuit therefor.

The unusual thermoconductive, photoconductive and other advantageous properties of this invention are due to the presence of iron in the germanium devices thereof. The influence of the iron is dependent upon the ability of iron atoms in a crystalline germanium body to affect the number of available conduction carriers within the germanium. Since the solubility of iron in germanium is very low, (less than $10^{14}$ atoms of iron per cubic centimeter of germanium) the number of available conduction carriers due to other impurities within the germanium should be of a low order of magnitude so that changes due to the effect of the traces of iron present are effective to change the conduction characteristics of the germanium body. In preparing germanium devices according the the invention, the number of conduction carriers may be reduced to the proper magnitude in several ways. One method is to use germanium prepurified by zone melting in which donor and acceptor type impurities have been reduced to the desired concentration. Another method is by controlling the presence of donor and acceptor impurities within the germanium body so that the presence of donors and acceptors nearly compensates each other. Another method is by heat treating the impregnated crystalline body after it is formed as is more particularly described hereinafter.

In order that the number of conduction carriers in the germanium body be present in the proper concentrations so that the iron present therein be effective to produce the unusual properties of this invention, the presence of donor and acceptor impurities, other than iron, should be regulated so that an excess of the type of impurities which control the electrical properties of the germanium body must be limited. Thus while the absolute magnitude of donor and acceptor impurities may vary, there should be an excess of donor impurities over acceptor impurities. Such excesses of donor activator impurities over acceptor activator impurities shall hereinafter be denominated as uncompensated donor impurities. As has been noted hereinbefore, the solubility of iron in germanium is somewhat less than $10^{14}$ atoms of iron per cubic centimeter of germanium. Due to this figure the total number of uncompensated impurities in the germanium bodies of this invention should be of the order of $10^{14}$ or less atoms per cubic centimeter of germanium for the presence of iron to have optimum effect upon the conduction characteristics of the germanium bodies.

The above cited solid solubility of iron in germanium has reference to germanium crystals without defects. It is possible, however, that greater amounts of iron may be present in germanium crystals which show structural defects resulting in lineage and small angle grain boundaries. While such crystals may show useful thermoconductive and photoconductive properties, the crystals are inhomogeneous and their behavior is not as predictable as is the behavior of the crystals without such defects discussed herein.

A further method of reducing the number of conduction carriers in the germanium bodies of the invention is to prepare the base germanium, to which iron is later added, in such a pure state that the number of uncompensated donor activator impurities present is less than $10^{14}$ atoms per cubic centimeter of germanium. Of course, any two or more of these methods may be combined, as for example, a sample of germanium may be partially purified, then compensated to reduce the number of uncompensated donor impurities to the desired value.

In preparing the iron-impregnated germanium bodies of the invention it is preferred to add traces of iron to a melt of high purity germanium from which a crystal is grown. However, other methods of including iron in the germanium crystal may be considered. For example, the iron may be diffused into a germanium crystal at high temperatures with proper precaution being taken to subsequently anneal out undesirable effects of the heat treatment.

The term "trace of iron" is used herein to mean from $10^{12}$ to $10^{14}$ atoms of iron per cubic centimeter of germanium. The term "high purity germanium" is used herein to mean germanium having less than $5\times10^{13}$ atoms of impurities per cubic centimeter of germanium and corresponds to germanium having a resistivity of greater than 40 ohm centimeters at 25° C. This high purity germanium is further characterized in that the conductivity characteristics of the germanium are intrinsic at 25° C. and can be maintained as intrinsic at resistivities ranging up to 300 ohm centimeters corresponding to a temperature of 250° Kelvin or about −25° C. The conduction characteristics of a germanium body may be said to be intrinsic when the conduction carriers in the germanium body comprise essentially equal numbers of electrons and positive holes. Because of the substantial freedom from other activator impurities the germanium is substantially intrinsic at higher temperatures before impregnation with iron. The addition of a trace of iron to the high purity room temperature intrinsic germanium decreases room temperature resistivity slightly and greatly enhances the thermoconductive and photoconductive properties of the germanium body at low temperatures. Thus, the provision of thermo-control and photo-control elements suitable for use at low temperatures is possible. An added property induced into high purity room temperature intrinsic germanium by the addition of a trace of iron is the substantial reduction of recombination lifetime of the germanium body making it possible to use the germanium body for asymmetrically conducting devices, as for instance rectifiers, at high frequencies without the sacrifice of other desirable characteristics of the germanium.

In Fig. 1, there is shown an application of one feature of the invention. The schematic diagram of Fig. 1 represents the use of a thermoconductive element 10 in the schematic circuit of a device for observing deviations in temperature from a preselected mean in a medium to be monitored as, for example, a portion of a liquid nitrogen still. Thermoconductive element 10 is connected in the high impedance leg of bridge circuit 11. The other resistance 12 in this leg should be selected so as to have the same order of magnitude of resistance as thermoconductance element 10 at the temperature at which it is used. The other leg of bridge 11 may be composed of low impedance resistances 13 and variable low resistance element 14, by which adjustments of the circuit may be made. A source of voltage which may be battery 15 is connected between the high impedance and the low impedance leg of bridge 11. The center of the low impedance leg is grounded, and the center of the high resistance leg is connected to the grid of vacuum tube detector 16. The output of vacuum tube detector 16 may be applied to meter 17 which indicates deviations from the selected mean temperature of the liquid in vat 18. Thermoconductive element 10 comprises a crystalline germanium bar 19 impregnated with a trace of iron. Germanium bar 19 is preferably monocrystalline and may conveniently be ½" long and $\frac{1}{16}$" thick and wide. The iron is incorporated into the germanium in relatively small amounts, of the order of $10^{12}$ to $10^{14}$ atoms of iron per cubic centimeter of germanium.

According to the preferred form of the invention whereby a trace of iron is added to a melt of high purity germanium, germanium bar 19 may be easily provided by seed crystal withdrawal during solidification from a melt of high purity germanium. The base germanium material should be substantially intrinsic at room temperatures, having a solidified resistivity in excess of 40 ohm centimeters at 25° C. To this germanium melt is added from 0.05 to 0.1 atomic percent of iron. The technique of growing a monocrystalline germanium ingot by seed crystal withdrawal is now well known to the art and is described in several publications, for example, an article entitled "Preparation of Germanium Single Crystals" by Roth and Taylor in the Proceedings of the I. R. E., vol. 40, pages 1338 to 1341, November, 1952. Because of the low segregation coefficient of iron relative to germanium (about $5\times10^{-6}$ or less), only about $10^{13}$ atoms per cubic centimeter of iron will be assimilated by the growing germanium ingot. Even the addition of minute traces of iron corresponding, for example, to the presence of $10^{12}$ atoms of iron or less per cubic centimeter of germanium has pronounced effect, if the germanium is otherwise sufficiently pure, and causes an unusual enhancement of the thermoconductive and photoconductive properties of the germanium material.

Low resistance, non-rectifying contact connections 20 and 21 may comprise pure tin or alloys of tin and fractional percentages of arsenic, as for example ½% arsenic, or alloys of indium and arsenic, as for example, indium plus approximately 10% arsenic, or substantially pure tin, if germanium bar 19 possesses N-type conduction characteristics at temperatures below −25° C.

If however germanium bar 19 possesses P-type conduction characteristics below 25° C., low resistance contacts 20 and 21 may be any acceptor activator element for germanium, as for example aluminum, gallium, or indium or alloys thereof.

Figure 2:
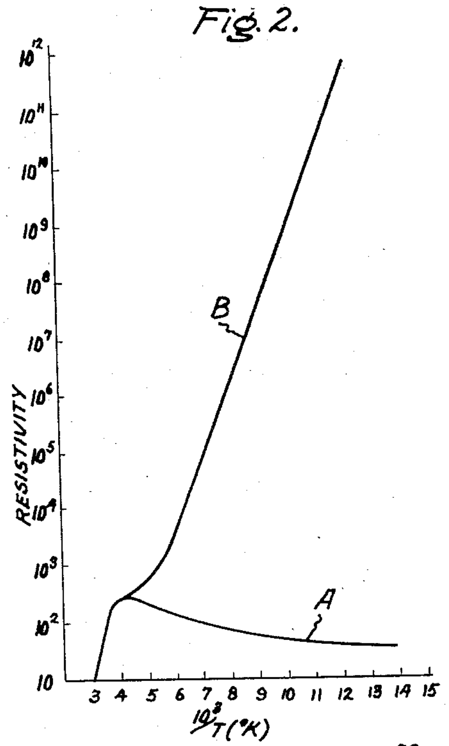
Fig. 2 is a group of curves illustrating the improvement of the thermoconductive properties resulting from the presence of iron in the thermoconductive device of Fig. 1.

The enhancement of the thermoconductive properties of germanium resulting from the impregnation thereof with iron is illustrated by the curves of Fig. 2. In Fig. 2 curve A is a plot of resistivity versus the reciprocal of temperature of a germanium bar extracted from a portion of an ingot grown from the melt of high purity germanium, intrinsic at room temperature, before the addition of iron to the melt. Curve B, on the other hand, is a plot of the resistivity versus reciprocal temperature curve of a germanium bar extracted from a portion of the same ingot grown from the same germanium melt after approximately 50 milligrams of iron were added for each 100 grams of germanium in the melt. As can be seen from these curves the germanium bar extracted from the portion grown before iron was added to the melt exhibits only a small change in resistivity over the temperature range from 0° C. to −200° C. While the sample extracted from the iron-impregnated portion of the ingot exhibits a very sharp increase in resistivity for decreases in temperature over this temperature range. As can be seen from the slope of curve B the resistivity of the iron impregnated germanium bar 19 varies from a few hundred ohms to a value of the order of $10^{12}$ ohms in the temperature range from 0° C. to −200° C. This range of resistivity change lends itself admirably to the control of electric currents. By adjusting the impedance of vacuum tube detector 16 to match the order of impedance magnitude of germanium bar 19 over the range of temperatures to be monitored by the thermoconductive device 10, the change in resistance of the thermoconductive device 10, as a result of any change in temperatures thereof, immediately appears upon meter 18. Alternatively the output of detector 17 may be used to control the operation of a still or other apparatus by regulation of other control circuits.

Figure 3:
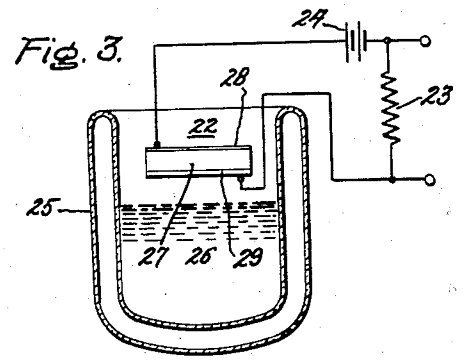
Fig. 3 illustrates a photoconductive control device embodying the invention and an electric circuit therefor.

Referring now to Fig. 3, there is shown a photoconductive cell 22 embodying the invention and connected in a suitable electrical circuit comprising the output resistor 23 and a battery 24. Photoconductive cell 22 may be maintained at a desired low temperature by suspension within an insulated vessel 25 containing a liquefied gas 26 such as liquid air. Photoconductive cell 22 may comprise a germanium crystalline wafer 27 which may conveniently be a rectangular wafer ½" long and wide and about 50 mils thick. The photoconductive device 22 contains electrodes 28 and 29 on the opposite major surfaces of the germanium wafer 27. The upper electrode layer 28 may be in the form of a ring in order that incident light rays will reach and activate the germanium wafer 27. The configuration of lower layer 28 is not critical. Both electrodes 28 and 29 may comprise metals which make low resistance connection to germanium wafer 27. If germanium body 27 exhibits N-type conduction characteristics below —25° C., these electrodes may be of tin or an alloy of tin with arsenic or an alloy of indium with arsenic; however, it is evident that other low resistance contact electrodes may be devised. If, however, germanium body 27 exhibits P-type conduction characteristics below —25° C. electrodes 28 and 29 may comprise any acceptor activator element for germanium, as for example, aluminum, gallium or indium.

Germanium wafer 27 comprises germanium impregnated with the trace of iron within the same limits as set forth above with relation to germanium bar 19 of thermoconductive element 10. According to the preferred method of preparation, high purity germanium intrinsic from room temperature to —25° C., corresponding to a room temperature resistivity greater than 40 ohm centimeters, containing less than $10^{14}$ atoms of activator impurities, is used as the base germanium material and this germanium material is impregnated with from $10^{12}$ to $10^{14}$ atoms of iron per cubic centimeter of the germanium. This may be done by preparing a melt of room temperature intrinsic germanium having a room resistivity in excess of 40 ohm centimeters and adding from 50 to 100 miligrams of pure iron for 100 grams of germanium of the melt and then growing the ingot from this iron impregnated melt by seed crystal withdrawal therefrom. A wafer 27 cut from this grown ingot will then have the desired degree of iron impregnation, and a room temperature resistivity greater than 40 ohm centimeters. In addition, this range of iron impregnation of room temperature intrinsic germanium gives optimum response to incident light of the long infrared wavelengths greater than 4 microns.

Figure 4:
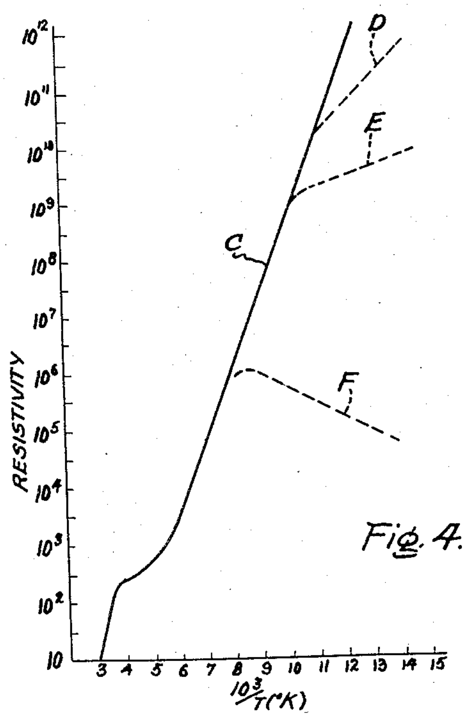
Fig. 4 is a group of curves illustrating the unusually high photoconductive properties of the device of Fig. 3.

The extent of the photoresponse of a low resistance contact, iron-impregnated N-type germanium photoconductive cell 22 of Fig. 3 is illustrated in Fig. 4. The solid line C of Fig. 4 is a plot of the resistance versus temperature characteristics of cell 22 when completely in the dark. The broken lines D, E, and F which meet the solid curve C indicate different levels of resistivity to which the photoconductive cell drops under impinging light of different and yet very low light intensities. As may be seen from these curves the photoconductive effect occurs from 0° C. to —200° C. Also, the range of resistivity level change under different light intensities is from about 10 ohms up to in excess of $10^{10}$ ohms. Moreover, the intensity of light required to bring about a marked change in resistivity is not very great. For example, in the case of one sample tested at the temperature of liquid nitrogen, the resistance fell from a value in excess of $10^{10}$ ohms in the dark to approximately 200 ohms under the light of a two-cell flashlight. An important feature of the invention also lies in the fact that iron-impregnated photoconductive cells are also quite sensitive to light of the long infrared wavelengths to 3.5 microns. As an example of the photosensitivity of a photocell similar to cell 20 one sample tested at a wavelength of 1.5 microns with an equivalent signal to noise ratio of unity using a 13 cycle per second input having a one-cycle bandwidth, the sensitivity was $2\times10^{-13}$ watts per square centimeter. This figure compares favorably with, and is of the same order of magnitude as the best infrared detecting devices known at the present time.

In addition to the hereinbefore described method of preparing samples of iron-impregnated germanium having unusual photoconductive properties suitable for use in germanium wafer 19 of element 10 or wafer 27 of element 20 from high purity room temperature intrinsic germanium, the invention includes methods of preparing such germanium elements from less pure germanium. According to one such method a melt of N-type germanium having donor impurities such as arsenic or antimony present in appropriate amounts as to cause the solidified resistivity of the melt to be of the order of 15 ohm centimeters or less may be used. Iron is added to this melt in the same proportions as to the high purity germanium melt, namely in proportions from 0.05 to 0.1 atomic percent. A crystal grown from this melt by the aforementioned seed crystal withdrawal method will not exhibit the high temperature and photoresponse effects necessary for elements 19 and 27, but will have low recombination lifetime. If, however, such a crystal is properly heat treated, it will show the same thermosensitive and photosensitive effects as a crystal grown from a high purity iron-impregnated germanium melt. The exact temperature and time of heat treatment may vary somewhat depending upon the purity of the original germanium, but as an example, one sample prepared from a melt having approximately 0.01 atomic percent of antimony present and having a solidified room temperature resistivity of 15 ohm centimeters, displayed the desired photosensitive and thermosensitive properties when treated at approximately 700° C. for approximately 3 minutes. While only one example is herein given by way of illustration, it is to be understood that this heat treatment technique may be used to prepare either N-type or P-type germanium crystalline bodies exhibiting the desired thermoconductive and photoconductive properties from less pure, iron-impregnated germanium.

Figures 5, 6:
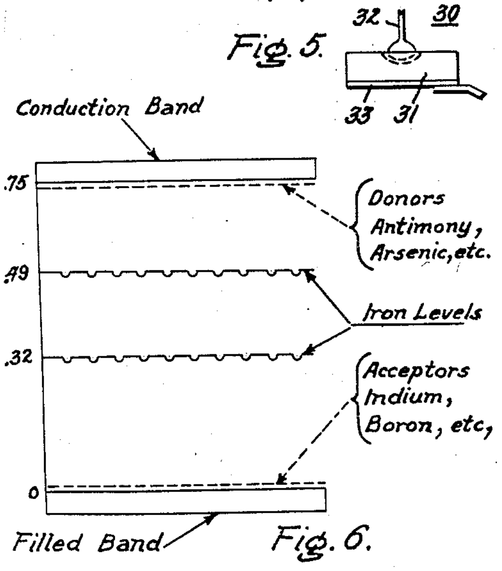
Fig. 5 illustrates a rectifier embodying the invention.
Fig. 6 is an energy level diagram of germanium impregnated with certain designated impurities.

Referring now to Fig. 5, there is disclosed another embodiment of the invention in the form of a rectifier 30 comprising a germanium crystalline wafer 31 and a pair of connections 32 and 33 on opposite major surfaces of wafer 31. Germanium wafer 31 is preferably monocrystalline and may be conveniently ¼" long and wide, and of the order of one millimeter thick. Germanium wafer 31 consists of high purity crystalline body having been grown from a melt to which a trace of iron has been added substantially as the germanium wafer 19 of thermoresponsive element 10 and of the germanium wafer 27 of photoresponsive element 22.

If germanium body 31 exhibits N-type conduction characteristics, electrode 32 may constitute an acceptor activator for germanium, such as indium, which is fused to and within a surface adjacent region of N-type germanium wafer 31 to form a P-N junction therewith in accord with techniques more fully described in application Serial No. 187,490, William C. Dunlap, filed on June 15, 1951 and assigned to the same assignee as the present invention. Electrode 33 preferably comprises a low resistance non-rectifying contact for N-type germanium which may be tin or an alloy of tin and arsenic. If, on the other hand, germanium wafer 31 exhibits P-type conduction characteristics, electrode 32 may comprise a donor activator alloy, as for example indium plus 10 atomic percent of arsenic, or a lead and antimony alloy. These contacts are applied similarly to the process for fusing acceptor impurity elements to N-type germanium. As is the case with N-type germanium, electrode 33 preferably should be a low resistance non-rectifying contact for P-type germanium, as for example, tin or indium. In accord with the invention germanium wafer 31 consists of high purity germanium impregnated with iron to the extent of approximately $10^{12}$ to $10^{14}$ atoms of iron per cubic centimeter of germanium. By high purity germanium is meant germanium having a resistivity before the addition of iron thereto of greater than 40 ohm centimeters, corresponding to the presence of no more than $5\times10^{13}$ atoms of activator impurity elements per cubic centimeter of germanium. The addition of a trace of iron to the germanium, from which is grown the crystal from which germanium wafer 31 is cut, is known to decrease the recombination lifetime of the germanium by a factor of from 100 to 500 times, thus making a germanium rectifier having high resistivity and high breakdown voltage suitable for high frequency applications. As an example of such an application, one N-type germanium rectifier made according to the above mentioned technique showed a lifetime of approximately 3 microseconds with an indium dot as contact 32 and a tin base contact 33. This rectifier, having a 7 millimeter square area indium dot electrode, showed a reverse breakdown voltage of 450 volts and a back saturation current of 1 milliampere at 100 volts. Such rectifiers are suitable, by virtue of low recombination lifetimes, for use at frequencies up to ½ megacycle. This frequency may be obtained without the necessity of doping with antimony to reduce lifetime, which lowers resistivity, and thus lowers breakdown voltage, or grinding to excessively small dimensions and sacrificing physical strength.

It is believed that the reason for the unusual thermoconductive, photoconductive and lifetime effects of iron-impregnated germanium crystalline bodies may be explained with the energy level scheme for germanium shown in Fig. 6. As illustrated in Fig. 6, the iron impregnation induces at least two energy levels into the germanium crystal lattice. These levels are probably acceptor levels and are located at approximately 0.26 and 0.43 electron volts below the conduction band. This is to be contrasted with the conventional acceptor materials for germanium such as indium, boron or gallium whose energy levels lie very close, less than 0.02 electron volts only, to the filled band, or with the conventional donor materials for germanium such as antimony or arsenic whose energy levels lie very close, less than 0.02 electron volts only, to the conduction band. In a conducting N-type germanium body, current is carried in part by electrons which have been raised in energy from the trapping levels to the conduction band. At room temperatures namely 25° C. there is a sufficient number of these electrons present in the iron-impregnated germanium to allow a fair conduction current as represented by the relatively low value of 40 ohm centimeters resistivity. At this temperature there is a continuing interchange of electrons between the conduction band and the iron-induced trapping level. The probability that electrons will remain at the trapped level is, however, small, and sufficient electrons are available to carry on conduction. As the temperature of the iron-impregnated germanium is lowered, the number of free electrons contributing to the conduction from the filled band becomes negligible. Additionally, the probability of electrons remaining at the iron-induced trapping levels increases and thus less electrons are available as conduction carriers. This is to be contrasted with the phenomena of electron trapping at the levels introduced by the common group III and group V impurities. The probability of electron entrapment at these levels remains substantially the same with decreasing temperatures even so low as to the temperature of liquid hydrogen.

This decrease in available conduction carriers in iron-impregnated germanium results in higher resistivity with decreasing temperature. Similarly, at low temperature, when light energy falls upon an iron-impregnated germanium body, electrons are raised to the conduction band, and more conduction carriers are available. This results in increased conductivity. A similar explanation may be made for iron-impregnated P-type germanium.

In connection with the above-described model for germanium, it may be postulated how high resistivity N-type or P-type conduction characteristics may be obtained at low temperatures when the original germanium melt included an excess of donor activator impurities. Assume N atoms of iron are present in the germanium body. At low temperature each atom of iron can, depending upon temperature, trap one or two electrons. If there is present in the germanium body an excess of less than N electrons the body will be high resistivity P-type. If there is an excess of greater than N, but less than 2N electrons, the body will be high resistivity N-type.

It is to be understood however that this energy level diagram is offered only for the purpose of providing a possible scientific explanation of the phenomena involved in the operation of the devices of our invention and is not to be considered to restrict the scope of the invention or to impair the validity of the claims thereto if a different explanation should ultimately prove more accurate or comprehensive.

It will also be appreciated that although we have described specific embodiments of the invention many modifications may be made and we intend by the appended claims to cover all such modifications as fall within the true spirit and scope of the invention.

What we claim as new and desire to secure by Letters Patent of the United States is:

1. A photosensitive control device comprising a crystalline body of high purity germanium impregnated with from $10^{12}$ to $10^{14}$ atoms of iron per cubic centimeter of germanium, said body exhibiting a substantial decrease in resistivity for a small increase in the intensity of incident light, and a pair of low resistance connections to spaced regions of said body.

2. An electric current control device comprising a high purity germanium crystalline body having per cubic centimeter therein $10^{12}$ to $10^{14}$ atoms of iron, a finite excess of uncompensated donor activator elements for germanium not exceeding $10^{14}$ atoms thereof per cubic centimeter of germanium, and a pair of electrical connections to spaced regions of said body.

3. An electric current control device comprising a high purity germanium crystalline body impregnated with from $10^{12}$ to $10^{14}$ atoms of iron per cubic centimeter of germanium and substantially free of all other uncompensated activator elements for germanium, said body exhibiting a change in resistivity from a few hundred ohm centimeters at 0° C. to over $10^{10}$ ohm centimeters at −200° C., and a pair of low resistance connections to spaced regions of said body.

4. The electric current control device of claim 3 wherein the iron impregnated high purity germanium body is extracted from a monocrystalline ingot grown during solidification from a melt consisting of high purity, room temperature intrinsic germanium and from 0.05 to 0.1 atomic percent by weight of iron.

5. A photosensitive control device comprising a germanium crystalline body having a resistivity above 40 ohm centimeters at 25° C., said body being impregnated with from $10^{12}$ to $10^{14}$ atoms of iron per cubic centimeter of germanium and being substantially free of other uncompensated activator elements for germanium, said body exhibiting a substantial decrease in resistivity for a small increase in the intensity of incident light, and a pair of electrode connections to spaced regions of said body, said electrodes making low resistance connection with said body.

6. A semiconductor current control member comprising a crystalline body consisting essentially of germanium having a finite excess of uncompensated donor activator impurities for germanium not exceeding $10^{14}$ atoms per cubic centimeter thereof impregnated with from $10^{12}$ to $10^{14}$ atoms of iron per cubic centimeter of germanium.

7. A semiconductor current control member comprising a crystalline body consisting essentially of germanium having an excess of uncompensated donor activator impurities for germanium not exceeding $10^{14}$ atoms per cubic centimeter thereof impregnated with from $10^{12}$ to $10^{14}$ atoms of iron per cubic centimeter of germanium, said member exhibiting a change in resistivity from a few hundred ohm centimeters at 0° C. to over $10^{10}$ ohm centimeters at −200° C.

8. A semiconductor current control member comprising a crystalline body consisting essentially of germanium having an excess of uncompensated donor activator impurities for germanium not exceeding $10^{14}$ atoms per cubic centimeter thereof impregnated with from $10^{12}$ to $10^{14}$ atoms of iron per cubic centimeter of germanium, said member exhibiting a substantial decrease in resistivity for a small increase in the intensity of incident light.

9. An asymmetrically conducting device comprising a crystalline body of germanium having a finite excess of uncompensated donor activator impurities for germanium not exceeding $10^{14}$ atoms per cubic centimeter thereof impregnated with from $10^{12}$ to $10^{14}$ atoms of iron per cubic centimeter of germanium, a rectifying connection to one region of said body, and a low resistance connection to a second region of said body.

References Cited in the file of this patent

UNITED STATES PATENTS

| | | |
|---|---|---|
| 2,530,110 | Woodyard | Nov. 14, 1950 |
| 2,553,491 | Shockley | May 15, 1951 |
| 2,644,852 | Dunlap | July 7, 1953 |

OTHER REFERENCES

Philips Research Repts. vol. 8, No. 4 pages 241–244 (1953).